United States Patent
Nakagawa

(10) Patent No.: US 8,257,530 B2
(45) Date of Patent: Sep. 4, 2012

(54) PAIR OF TIRES FOR MOTORCYCLE AND METHOD OF USING TIRES FOR MOTORCYCLE

(75) Inventor: Hidemitsu Nakagawa, Saitama (JP)

(73) Assignee: Bridgestone Corporation, Tokyo (JP)

( * ) Notice: Subject to any disclaimer, the term of this patent is extended or adjusted under 35 U.S.C. 154(b) by 76 days.

(21) Appl. No.: 12/663,437

(22) PCT Filed: Apr. 18, 2008

(86) PCT No.: PCT/JP2008/057622
§ 371 (c)(1),
(2), (4) Date: Jan. 25, 2010

(87) PCT Pub. No.: WO2008/149611
PCT Pub. Date: Dec. 11, 2008

(65) Prior Publication Data
US 2010/0180996 A1    Jul. 22, 2010

(30) Foreign Application Priority Data
Jun. 7, 2007 (JP) ................ 2007-151968

(51) Int. Cl.
B29D 30/00 (2006.01)
B60C 1/00 (2006.01)
B60C 11/00 (2006.01)
(52) U.S. Cl. ............ 156/110.1; 29/428; 152/209.5; 152/209.11; 152/904
(58) Field of Classification Search ............ 156/110.1; 29/428; 152/209.5, 209.11, 904
See application file for complete search history.

(56) References Cited

U.S. PATENT DOCUMENTS

| 3,515,197 | A  | * | 6/1970  | Boileau   | 152/904   |
|-----------|----|---|---------|-----------|-----------|
| 6,977,020 | B2 | * | 12/2005 | Nakamura  | 156/110.1 |
| 2006/0102266 | A1 | * | 5/2006 | Ravasio et al. | 152/209.5 |
| 2010/0024938 | A1 | * | 2/2010 | Ishiyama | 152/209.5 |
| 2010/0163145 | A1 | * | 7/2010 | Nakagawa | 152/209.5 |

(Continued)

FOREIGN PATENT DOCUMENTS
DE     1480962     *   6/1969
(Continued)

OTHER PUBLICATIONS
Machine translation for German 1,480,962 (no date).*
(Continued)

Primary Examiner — Steven D Maki
(74) Attorney, Agent, or Firm — Sughrue Mion, PLLC

(57) ABSTRACT

A tread portion of a tire 1 to be mounted to a front wheel is divided in the tire widthwise direction into three regions comprising the center tread region A and respective shoulder tread regions C. Two types of tread rubber are used for the tread portion of the front tire. JIS-A hardness of tread rubber of the center tread region A is larger than JIS-A hardness of tread rubber of each shoulder tread region C. A tread portion of a rear tire 11 is divided in the tire widthwise direction into five regions comprising the center tread region A, respective intermediate regions B and respective shoulder tread regions C. Three types of tread rubber are used for the tread portion of the rear tire. JIS-A hardness of tread rubber of the intermediate tread region B is larger than JIS-A hardness of tread rubber of the center tread region A and JIS-A hardness of tread rubber of each shoulder tread region C.

4 Claims, 1 Drawing Sheet

U.S. PATENT DOCUMENTS

2010/0175800 A1* 7/2010 Nakagawa ................ 152/209.5
2010/0193095 A1* 8/2010 Nakagawa ................ 152/209.5

FOREIGN PATENT DOCUMENTS

| JP | 06-270613 | * | 9/1994 |
| --- | --- | --- | --- |
| JP | 07-108805 | A | 4/1995 |
| JP | 7108805 | A | 4/1995 |
| JP | 10-119513 | * | 5/1998 |
| JP | 10-119513 | A | 5/1998 |
| JP | 10119513 | A | 5/1998 |
| JP | 2000-177318 | A | 6/2000 |
| JP | 2000177318 | A | 6/2000 |
| JP | 2005-022622 | * | 1/2005 |
| JP | 2006-199112 | A | 8/2006 |
| JP | 2006199112 | A | 8/2006 |
| JP | 2006-273240 | A | 10/2006 |
| WO | 2007/052701 | A1 | 5/2007 |
| WO | 2007/055322 | A1 | 5/2007 |

OTHER PUBLICATIONS

Machine translation for Japan 10-119513 (no date).*
Machine translation for Japan 2005-022622 (no date).*
International Search Report of PCT/JP2008/057622 dated Jul. 22, 2008.
Extended European Search Report (EESR) issued by the European Patent Office dated May 26, 2011 in corresponding European Patent Application No. 08740669.0.
Chinese Office Action dated Feb. 22, 2012, issued in corresponding Chinese Patent Application No. 200880024905.5.

* cited by examiner

PAIR OF TIRES FOR MOTORCYCLE AND METHOD OF USING TIRES FOR MOTORCYCLE

TECHNICAL FIELD

The present invention relates to a pair of tires as the most suitable combination of a tire mounted to a front wheel and a tire mounted to a rear wheel of a motorcycle.

PRIOR ART

In a pneumatic tire for motorcycle in general, the center portion of a tire tread is primarily in contact with a road surface in straight running of a motorcycle because the vehicle body of the motorcycle then stands substantially upright with respect to the road surface, while a shoulder portion of the tire tread is primarily in contact with a road surface in a cornering situation because the vehicle body is inclined with respect to the road surface in that situation. As a result, in a tire to be mounted to the rear wheel of a motorcycle, the vicinity of the center portion of a tire tread, which is brought into contact with the ground in straight running, needs to have adequate rigidity which can resist driving force in the longitudinal direction and the vicinity of a shoulder portion of the tire tread, which is brought into contact with the ground in a cornering situation, needs to reliably exhibit good gripping force which can resist lateral force.

Conventionally, there has been proposed, as a pneumatic tire for motorcycle where the performance necessitated in straight running and the performance necessitated in a cornering situation are made compatible with each other, a tire using two types of tread rubber for a tread divided into three sections in the tire widthwise direction as disclosed, for example, in JP 2006 273240.

DISCLOSURE OF THE INVENTION

Problems to be Solved by the Invention

However, the roles of front wheel and rear wheel clearly differ from each other in a motorcycle. The front wheel has a role, as a steering wheel, of operating the vehicle by changing steering angle, whereby a tire to be mounted to the front wheel needs to be designed such that the vicinity of the center portion of a tire tread thereof exhibits satisfactory responsiveness to change in steering angle. On the other hand, the vicinity of a shoulder portion of the tire tread of the front tire, which portion is brought into contact with the ground in a cornering situation, needs to reliably exhibit gripping force which can resist a relatively large lateral force, rather than responsiveness, because the vicinity of a shoulder portion has a role of fixing steering angle in a cornering situation.

Regarding the tire to be mounted to the rear wheel, the vicinity of the center portion of a tire tread thereof needs to have adequate rigidity which can resist driving force in the longitudinal direction because the rear wheel is not imparted with a steering wheel and has a role as a driving wheel for driving the vehicle. On the other hand, the vicinity of each shoulder portion of the tire tread of the rear tire, which is brought into contact with the ground in a cornering situation, needs to reliably exhibit gripping force which can resist lateral force, and each intermediate portion interposed by the center portion and the corresponding shoulder portion of the tire tread needs to have rigidity and gripping force in a compatible manner because significant lateral force, as well as driving force in the longitudinal direction, is exerted on the intermediate portion in an accelerating situation to get out of a corner or the like.

The present invention has been contrived in view of the problem described above and an object thereof is to provide a pair of tires for motorcycle as the most suitable combination of a tire to be mounted to the front wheel and a tire mounted to the rear wheel, in which the roles of the respective tires are optimally ensured for enabling safer and more pleasant running than the conventional tire. Another object of the present invention is to provide a method of using these tires for motorcycle.

Means for Solving the Problem

The present invention provides a pair of tires for motorcycle, constituted of a front tire to be mounted to the front wheel and a rear tire to be mounted to the rear wheel of a motorcycle, characterized in that:

a tread portion of the front tire is divided in the tire widthwise direction into three regions comprising the center tread region including the tire equatorial plane and respective shoulder tread regions each including a tread ground contact end;

two types of tread rubber are used for the tread portion of the front tire;

a tread portion of the rear tire is divided in the tire widthwise direction into five regions comprising the center tread region including the tire equatorial plane, respective shoulder tread regions each including a tread ground contact end, and respective intermediate tread regions each interposed by the center tread region and the corresponding shoulder tread region; and three types of tread rubber are used for the tread portion of the rear tire.

Further, the present invention provides a method of using tires for motorcycle, comprising:

mounting a front tire to the front wheel of a motorcycle, a tread portion of which front tire is divided in the tire widthwise direction into three regions comprising the center tread region including the tire equatorial plane and respective shoulder tread regions each including a tread ground contact end, two types of tread rubber being used for the tread portion of the front tire; and mounting a rear tire to the rear wheel of the motorcycle, a tread portion of which rear tire is divided in the tire widthwise direction into five regions comprising the center tread region including the tire equatorial plane, respective shoulder tread regions each including a tread ground contact end, and respective intermediate tread regions each interposed by the center tread region and the corresponding shoulder tread region, three types of tread rubber being used for the tread portion of the rear tire.

In the front tire, JIS-A hardness of tread rubber of the center tread region is larger than JIS-A hardness of tread rubber of each shoulder tread region. In the rear tire, JIS-A hardness of tread rubber of the intermediate tread region is larger than JIS-A hardness of tread rubber of the center tread region and JIS-A hardness of tread rubber of each shoulder tread region.

Further, in the front tire or the tire for the front wheel, a curved length in the tire widthwise direction of a tread surface of the center tread region is preferably in the range of 10 to 70% of the curved length in the tire widthwise direction of the entire tread surface. In the rear tire or the tire for the rear wheel, a curved length in the tire widthwise direction of a tread surface of the center tread region is preferably in the range of 10 to 35% of the curved length in the tire widthwise direction of the entire tread surface and the whole curved length in the tire widthwise direction of a tread surface of the shoulder tread regions is in the range of 5 to 35% of the curved length in the tire widthwise direction of the entire tread surface,

EFFECT OF THE INVENTION

According to the present invention, the most suitable combination of a tire to be mounted to the front wheel as a steering wheel and a tire mounted to the rear wheel as a driving wheel, in which combination the functions of the respective tires are optimally ensured, is provided, whereby safer and more pleasant running than the conventional tire is ensured.

Explanation of Reference Numerals

| | |
|---|---|
| 1, 11 | Tire |
| 2, 12 | Tread portion |
| 3, 13 | Sidewall portion |
| 4, 14 | Bead portion |
| 5, 15 | Bead core |
| 6, 16 | Carcass |
| 7, 17 | Belt |
| A | Center tread region |
| B | Intermediate tread region |
| C | Shoulder tread region |

BEST MODE FOR IMPLEMENTING THE INVENTION

Figure 1:
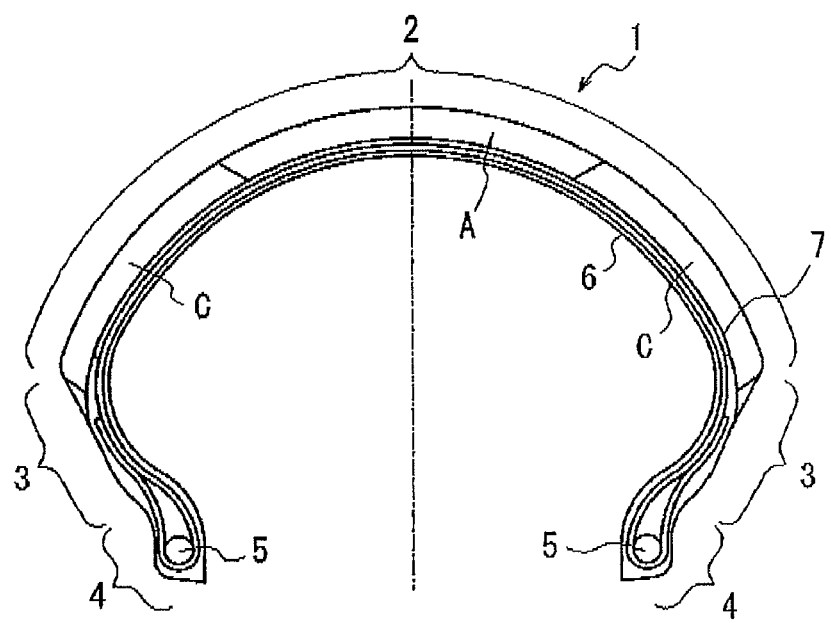
FIG. 1 is a sectional view in the widthwise direction of a front tire constituting a pair of tires for motorcycle of the present invention.

An embodiment of the present invention will be described with reference to drawings. FIG. 1 is a sectional view in the tire widthwise direction of a front tire or a tire for the front wheel, which tire is a constituent of a pair of tires for motorcycle of the present invention. The front tire 1 shown in FIG. 1 has a pair of bead portions 4 each having a bead core 5 embedded therein, a pair of sidewall portions 3 extending from the bead portions 4 toward the outer side in the tire radial direction, and a tread portion 2 extending over the respective sidewall portions. The tire further has a carcass 6 constituted of a carcass ply extending in a toroidal shape between the bead cores 5 embedded in the respective bead portions 4 and including side portions each being turned up around the corresponding bead core 5 toward the outer side in the tire radial direction, and a belt 7 provided outer side in the radial direction of the carcass 6.

The tread portion 2 is divided in the tire widthwise direction into three regions comprising the center tread region A including the tire equatorial plane and respective shoulder tread regions C each including a tread ground contact end. Two types of tread rubber are used for the tread portion 2. JIS-A hardness of tread rubber of the center tread region A is larger that JIS-A hardness of thread rubber of each of the shoulder tread regions C. In the present invention, "JIS-A hardness" represents hardness measured by using a type A durometer according to JIS K6253 at the room temperature of 20° C. Further, a curved length in the tire widthwise direction of a tread surface of the center tread region is in the range of 10 to 70% of the curved length in the tire widthwise direction of the entire tread surface.

As described above, the front wheel of a motorcycle has a role of operating the vehicle by changing steering angle, whereby a tire to be mounted to the front wheel needs to be designed such that the center tread region A reliably exhibits satisfactorily good responsiveness to change in steering angle. On the other hand, each of the shoulder tread regions C of the front tire, which portion is brought into contact with the ground in a cornering situation, needs to reliably exhibit gripping force which can resist a relatively large lateral force, rather than good responsiveness, because each shoulder region has a role of fixing steering angle in a cornering situation.

Accordingly, in order to enable safer and more pleasant running of a front tire motorcycle than the prior art, the tread portion 2 of the front tire for motorcycle preferably has a structure where: the tread portion is divided into three regions comprising the center tread portion A and the respective shoulder tread regions C; physical properties of rubber of the center tread region A are different from those of the shoulder tread regions C; and JIS-A hardness of tread rubber of the center tread region A is larger than ITS-A hardness of tread rubber of each of the shoulder tread regions C.

Further, a curved length in the tire widthwise direction of a tread surface of the center tread region A is preferably in the range of 10 to 70% of the curved length in the tire widthwise direction of the entire tread surface. In a case where the curved length of the center tread region A is less than 10% of the curved length of the entire tread surface, an effect of enhancing responsiveness deteriorates. In a case where the curved length of the center tread region A exceeds 70% of the curved length of the entire tread surface, an effect of increasing turning force (gripping force) deteriorates.

Figure 2:
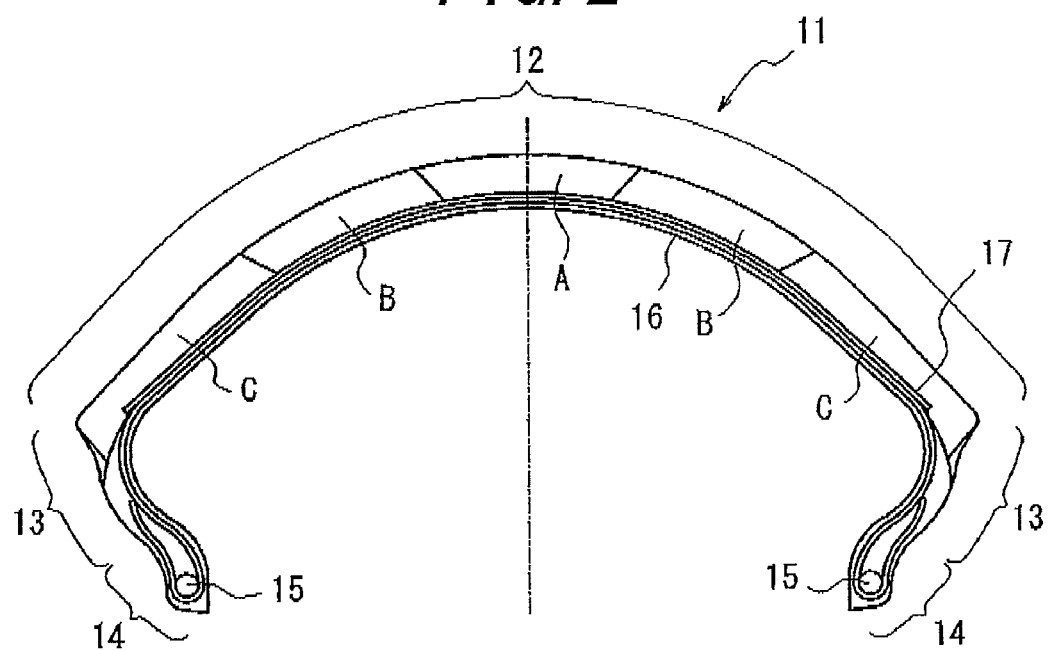
FIG. 2 is a sectional view in the widthwise direction of a rear tire constituting a pair of tires for motorcycle of the present invention.

FIG. 2 is a sectional view in the widthwise direction of a rear tire or a tire for the rear wheel, which tire is a constituent of a pair of tires for motorcycle of the present invention. The rear tire 11 shown in FIG. 2 has a pair of bead portions 14 each having a bead core 15 embedded therein, a pair of sidewall portions 13 extending from the bead portions 14 toward the outer side in the tire radial direction, and a tread portion 12 extending over the respective sidewall portions. The tire further has a carcass 16 constituted of a carcass ply extending in a toroidal shape between the bead cores 15 embedded in the respective bead portions 14 and including side portions each being turned up around the corresponding bead core 15 toward the outer side in the tire radial direction, and a belt 17 provided outer side in the radial direction of the carcass 16.

The tread portion 12 is divided in the tire widthwise direction into five regions comprising the center tread region A including the tire equatorial plane, respective shoulder tread regions C each including a tread ground contact end, and respective intermediate tread regions B each interposed by the center tread region A and the corresponding shoulder tread region C. Three types of tread rubber is used for the tread portion 2. JIS-A hardness of tread rubber of the intermediate tread region B is larger than JIS-A hardness of tread rubber of the center tread region A and JIS-A hardness of tread rubber of each of the shoulder tread regions C. Further, a curved length in the tire widthwise direction of a tread surface of the center tread region A is preferably in the range of 10 to 35% of the curved length in the tire widthwise direction of the entire tread surface and the whole curved length in the tire widthwise direction of a tread surface of the shoulder tread regions C is in the range of 5 to 35% of the curved length in the tire widthwise direction of the entire tread surface.

As described above, the rear wheel of a motorcycle has a role of driving the vehicle as a driving wheel. Therefore, in a tire to be mounted to the rear wheel, the center tread region A, which is brought into contact with the ground in straight running, needs to have adequate rigidity which can resist driving force in the longitudinal direction, each shoulder tread region C, which is brought into contact with the ground in a cornering situation, needs to reliably exhibit good gripping force to resist lateral force, and the respective intermediate tread regions B located between the center tread region and the respective shoulder tread regions need to exhibit the aforementioned rigidity and gripping force in a compatible manner because significant lateral force, as well as driving force in the longitudinal direction, is exerted on the intermediate tread portion in an accelerating situation to get out of a corner or the like.

Accordingly, to enable safer and more pleasant running of a rear tire of a motorcycle than the prior art, the tread portion 2 preferably has a configuration in which the tread portion is divided into five sections as described above and the center tread region A, the intermediate tread regions B and the shoulder tread regions C have different physical properties of rubber, respectively. Further, JIS-A hardness of tread rubber of the intermediate tread region B is preferably larger than JIS-A hardness of tread rubber of the center tread region A and ITS-A hardness of tread rubber of each of the shoulder tread regions C.

Yet further, a curved length in the tire widthwise direction of a tread surface of the center tread region A is preferably in the range of 10 to 35% of the curved length in the tire widthwise direction of the entire tread surface. In a case where the curved length of the center tread region A is less than 10% of the curved length of the entire tread surface, an effect of enhancing driving force deteriorates. In a case where the curved length of the center tread region A exceeds 35% of the curved length of the entire tread surface, an effect of turning force (gripping force) deteriorates.

Yet further, the whole curved length in the tire widthwise direction of a tread surface of the shoulder tread regions C is in the range of 10 to 35% of the curved length in the tire widthwise direction of the entire tread surface. In a case where the whole curved length of the shoulder tread regions C is less than 5% of the curved length of the entire tread surface, an effect of increasing turning force (gripping force) deteriorates. In a case where the whole curved length of the shoulder tread regions C exceeds 35% of the curved length of the entire tread surface, an effect of driving force deteriorates.

The present invention will be described with reference to Examples hereinafter. There were prepared test front tires of Examples and Comparative Examples each having tire size of 120/70ZR17 and the structure as shown in FIG. 1 according to the details shown in Table 1. Responsiveness and turning force (gripping force) were analyzed for each of the test tires. The results of the analysis are shown in Table 1. Examples 1 to 3 each employed a carcass of two-ply structure made of rayon for the carcass 6 and steel MSB (mono-spiral belt) for the belt 7 of the front tire.

There were prepared test rear tires of Examples and Comparative Examples each having tire size of 190/50ZR17 and the structure as shown in FIG. 2 according to the details shown in Table 2. Driving force was analyzed for each of the test tires. The results of the analysis are shown in Table 2. Examples 1 to 3 each employed a ply made of nylon for the carcass 16 and steel MSB (mono-spiral belt) for the belt 17 of the rear tire.

Each of the test front tires and the test rear tires was mounted to a motorcycle (1000 cc) and run on a flat track, and responsiveness, turning force and driving force were evaluated by sensory evaluation conducted by a driver with the score 100 of the conventional front tire (the tread was not divided into sections, JIS-A hardness of the tread rubber was 56) and the score 100 of the conventional rear tire (the tread was not divided into sections, JIS-A hardness of the tread rubber was 51) as the reference. The larger score represents the better performance.

TABLE 1

| Front tire | Hardness of Center tread region | Hardness of Shoulder tread region | Division width of Center tread region | Responsiveness | Turning force |
|---|---|---|---|---|---|
| Conventional tire (no division) | 56 | 56 | 100 | 100 | 100 |
| Example 1 | 57 | 51 | 43 | 120 | 110 |
| Example 2 | 57 | 51 | 31 | 115 | 125 |
| Example 3 | 58 | 51 | 43 | 125 | 105 |
| Comparative Example | 54 | 58 | 80 | 90 | 90 |

TABLE 2

| Rear tire | Hardness of Center tread region | Hardness of Intermediate tread region | Hardness of Shoulder tread region | Division width of Center tread region (%) | Division width of Shoulder tread region (%) | Driving force |
|---|---|---|---|---|---|---|
| Conventional tire (no division) | 51 | 51 | 51 | 100 | | 100 |
| Example 1 | 53 | 58 | 50 | 22 | 22 | 120 |
| Example 2 | 53 | 58 | 50 | 22 | 18 | 125 |
| Example 3 | 55 | 58 | 48 | 22 | 18 | 130 |
| Comparative Example | 48 | 48 | 51 | 22 | 22 | 90 |

The front tire of Example 1 has a curved length in the tire widthwise direction of a tread surface of the center tread region, which is 43% of the curved length in the tire widthwise direction of the entire tread surface. JIS-A hardness values of tread rubber of the center tread region and tread rubber of the shoulder tread regions of this front tire are 57 and 51, respectively.

The rear tire of Example 1 has a curved length in the tire widthwise direction of a tread surface of the center tread region, which is 22% of the curved length in the tire widthwise direction of the entire tread surface, and the total curved length in the tire widthwise direction of a tread surface of the shoulder tread regions, which is 22% of the curved length in the tire widthwise direction of the entire tread surface. JIS-A hardness values of tread rubber of the center tread region, tread rubber of the intermediate regions, and tread rubber of the shoulder tread regions of this rear tire are 53, 58 and 50, respectively.

In Example 1, responsiveness and turning force of the front tire were 120 and 110, respectively, and driving force of the rear tire was 120.

The front tire of Example 2 has a curved length in the tire widthwise direction of a tread surface of the center tread region, which is 31% of the curved length in the tire widthwise direction of the entire tread surface. JIS-A hardness values of tread rubber of the center tread region and tread rubber of the shoulder tread regions of this front tire are 57 and 51, respectively.

The rear tire of Example 1 has a curved length in the tire widthwise direction of a tread surface of the center tread region, which is 22% of the curved length in the tire widthwise direction of the entire tread surface, and the total curved length in the tire widthwise direction of a tread surface of the shoulder tread regions, which is 18% of the curved length in the tire widthwise direction of the entire tread surface. JIS-A hardness values of tread rubber of the center tread region, tread rubber of the intermediate regions, and tread rubber of the shoulder tread regions of this rear tire are 53, 58 and 50, respectively.

In Example 2, responsiveness and turning force of the front tire were 115 and 125, respectively, and driving force of the rear tire was 125.

The front tire of Example 3 has a curved length in the tire widthwise direction of a tread surface of the center tread region, which is 43% of the curved length in the tire widthwise direction of the entire tread surface. JIS-A hardness values of tread rubber of the center tread region and tread rubber of the shoulder tread regions of this front tire are 58 and 51, respectively.

The rear tire of Example 1 has a curved length in the tire widthwise direction of a tread surface of the center tread region, which is 22% of the curved length in the tire widthwise direction of the entire tread surface, and the total curved length in the tire widthwise direction of a tread surface of the shoulder tread regions, which is 18% of the curved length in the tire widthwise direction of the entire tread surface. JIS-A hardness values of tread rubber of the center tread region, tread rubber of the intermediate regions, and tread rubber of the shoulder tread regions of this rear tire are 55, 58 and 48, respectively.

In Example 3, responsiveness and turning force of the front tire were 125 and 105, respectively, and driving force of the rear tire was 130.

In Comparative Example, a tire having a tread portion divided into three regions was used for the front tire and the rear tire, respectively. The front tire of Comparative Example has a curved length in the tire widthwise direction of a tread surface of the center tread region, which is 80% of the curved length in the tire widthwise direction of the entire tread surface. JIS-A hardness values of tread rubber of the center tread region and tread rubber of the shoulder tread regions of this front tire are 54 and 58, respectively.

The rear tire of Comparative Example has a curved length in the tire widthwise direction of a tread surface of the center tread region, which is 22% of the curved length in the tire widthwise direction of the entire tread surface, and the total curved length in the tire widthwise direction of a tread surface of the shoulder tread regions, which is 22% of the curved length in the tire widthwise direction of the entire tread surface. JIS-A hardness values of tread rubber of the center tread region, tread rubber of the intermediate regions, and tread rubber of the shoulder tread regions of this rear tire are 48, 48 and 51, respectively.

In Comparative Example, responsiveness and turning force of the front tire were 90 and 90, respectively, and driving force of the rear tire was 90.

As described above, it is understood that responsiveness and turning force of the front tire and driving force of the rear tire are improved, respectively, in Examples 1 to 3.

The invention claimed is:

1. A method of using tires for motorcycle, comprising:
    mounting a front tire to the front wheel of a motorcycle, a tread portion of which front tire is divided in the tire widthwise direction into three regions comprising the center tread region including the tire equatorial plane and respective shoulder tread regions each including a tread ground contact end, only two different types of tread rubber being used for the tread portion of the front tire, JIS-A hardness of tread rubber of the center tread region being larger than JIS-A hardness of tread rubber of each shoulder tread region in the front tire; and
    mounting a rear tire to the rear wheel of the motorcycle, a tread portion of which rear tire is divided in the tire widthwise direction into five regions comprising the center tread region including the tire equatorial plane, respective shoulder tread regions each including a tread ground contact end, and respective intermediate tread regions each interposed by the center tread region and the corresponding shoulder tread region, three different types of tread rubber being used for the tread portion of the rear tire, JIS-A hardness of tread rubber of the intermediate tread region being larger than JIS-A hardness of tread rubber of the center tread region and JIS-A hardness of tread rubber of each shoulder tread region in the rear tire.

2. The method of using tires for motorcycle of claim 1, wherein:
    in the front tire, a curved length in the tire widthwise direction of a tread surface of the center tread region is in the range of 10 to 70% of the curved length in the tire widthwise direction of the entire tread surface; and
    in the rear tire, a curved length in the tire widthwise direction of a tread surface of the center tread region is in the range of 10 to 35% of the curved length in the tire widthwise direction of the entire tread surface, and the whole curved length in the tire widthwise direction of a tread surface of the shoulder tread regions is in the range of 5 to 35% of the curved length in the tire widthwise direction of the entire tread surface.

3. A pair of tires constituted of a front tire to be mounted to the front wheel and a rear tire to be mounted to the rear wheel of a motorcycle, characterized in that:
    a tread portion of the front tire is divided in the tire widthwise direction into three regions comprising the center tread region including the tire equatorial plane and respective shoulder tread regions each including a tread ground contact end;

only two different types of tread rubber are used for the tread portion of the front tire;

in the front tire, JIS-A hardness of tread rubber of the center tread region is larger than JIS-A hardness of tread rubber of each shoulder region;

a tread portion of the rear tire is divided in the tire widthwise direction into five regions comprising the center tread region including the tire equatorial plane, respective shoulder tread regions each including a tread ground contact end, and respective intermediate tread regions each interposed by the center tread region and the corresponding shoulder tread region;

three different types of tread rubber are used for the tread portion of the rear tire; and in the rear tire, JIS-A hardness of tread rubber of the intermediate tread region is larger than JIS-A hardness of tread rubber of the center tread region and JIS-A hardness of tread rubber of each shoulder tread region.

4. The pair of tires for motorcycle of claim 3, wherein:

in the front tire, a curved length in the tire widthwise direction of a tread surface of the center tread region is in the range of 10 to 70% of the curved length in the tire widthwise direction of the entire tread surface; and in the rear tire, a curved length in the tire widthwise direction of a tread surface of the center tread region is in the range of 10 to 35% of the curved length in the tire widthwise direction of the entire tread surface, and the whole curved length in the tire widthwise direction of a tread surface of the shoulder tread regions is in the range of 5 to 35% of the curved length in the tire widthwise direction of the entire tread surface.

* * * * *